United States Patent [19]

Naik et al.

[11] Patent Number: 5,548,647
[45] Date of Patent: Aug. 20, 1996

[54] FIXED TEXT SPEAKER VERIFICATION METHOD AND APPARATUS

[75] Inventors: Jayant M. Naik, Dallas; George R. Doddington, Richardson, both of Tex.

[73] Assignee: Texas Instruments Incorporated, Dallas, Tex.

[21] Appl. No.: 34,315

[22] Filed: Apr. 3, 1987

[51] Int. Cl.⁶ .................................................. G01L 5/06
[52] U.S. Cl. .............................. 381/42; 381/41; 380/23; 380/25; 340/825.31; 340/825.34
[58] Field of Search .................... 380/23, 25; 381/41, 381/42; 364/513.5; 340/825.31, 825.34

[56] References Cited

U.S. PATENT DOCUMENTS

| | | | |
|---|---|---|---|
| 3,700,815 | 10/1972 | Doddington et al. | 381/42 |
| 3,896,266 | 7/1975 | Waterbury | 381/42 X |
| 4,449,189 | 5/1984 | Feix et al. | 364/513.5 |
| 4,716,593 | 12/1987 | Hirai et al. | 381/42 |
| 4,742,483 | 5/1988 | Morrell | 395/112 |
| 4,866,664 | 9/1989 | Burkhardt, Jr. et al. | 395/200 |
| 4,974,199 | 11/1990 | Verbanets, Jr. et al. | 395/275 |
| 5,007,013 | 4/1991 | Elms | 395/200 |
| 5,018,079 | 5/1991 | Shukunami et al. | 364/519 |
| 5,075,875 | 12/1991 | Love et al. | 395/117 |

*Primary Examiner*—Bernarr E. Gregory
*Attorney, Agent, or Firm*—W. Daniel Swayze, Jr.; W. James Brady, III; Richard L. Donaldson

[57] ABSTRACT

Speaker verification is performed by computing principal components of a fixed text statement comprising a speaker identification code and a two-word phrase, and principal spectral components of a random word phrase. A multiphrase strategy is utilized in access control to allow successive verification attempts in a single session, if the speaker fails initial attempts. Based upon a verification attempt, the system produces a verification score which is compared with a threshold value. On successive attempts, the criterion for acceptance is changed, and one of a number of criteria must be satisfied for acceptance in subsequent attempts. A speaker normalization function can also be invoked to modify the verification score of persons enrolled with the system who inherently produce scores which result in denial of access. Accuracy of the verification system is enhanced by updating the reference template which then more accurately symbolizes the person's speech signature.

83 Claims, 5 Drawing Sheets

FIG. 1

SPEAKER PERSONAL FILE a) IDENTIFICATION NUMBER
b) REFERENCE PSC VECTOR TEMPLATE
c) CUMULATIVE ATTEMPTS OF IDENTIFICATIONS
d) RUNNING AVERAGE OF PSC VECTOR

SYSTEM FILE

GLOBAL SPEAKER AVERAGE — 90

ENROLLMENT — 76

↓

CAPTURE UTTERANCE — 78

↓

COMPUTE PRINCIPAL SPECTRAL COMPONENT VECTORS — 80

↓

STORE VECTOR AS REFERENCE TEMPLATE — 82

FIXED TEXT SPEAKER VERIFICATION METHOD AND APPARATUS

This invention was made with Government support under Contact No. F30602-84-C -0030 awarded by the Department of the Air Force. The Government has certain rights in this invention.

TECHNICAL FIELD OF THE INVENTION

The present invention relates in general to methods and apparatus for ascertaining the identity of individuals, and more particularly relates to techniques for verifying the identity of individuals using speech or voice characteristics.

BACKGROUND OF THE INVENTION

The unique traits of each individual form a common basis for distinguishing one person from another. For example, people are easily identified by physical traits which can be easily distinguished by the visual senses. The vocal characteristics of a person can also be used to distinguish one person from another. In a business or commercial sense, individuals can be distinguished by ascribing numbers or other data to the individuals. For example, a person's social security number or driver's license number can be used to identify an individual, irrespective of any physical characteristics.

In some situations the identity of an individual is required to facilitate a transaction, while in other situations the identity of the individual becomes necessary before a response can occur. For example, secret codes or numbers are sometimes utilized as the identifying indicia in order to complete banking transactions using electronic tellers. In other situations, the entrance to secure areas requires the positive identification by a security guard, or other electronic device. While there are a myriad of techniques and devices for generally identifying individuals, such techniques are generally either complicated and costly, or require other human intervention, such as a security guard.

One approach for identifying individuals utilizes the speech or voice traits of the individuals as the characteristic trait. In such type of system, a person who desires or requires identification or verification simply voices words, numbers or phrases as an input to the system. Various parameters of the spoken words are compared with a voice specimen previously processed and stored, whereupon the electronic equipment provides an indication as to whether a positive or negative identification has been made. The quantizing and characterization of speech information for speaker verification is the subject matter of much current theorizing.

In contrast with speech recognition systems which can decode speech signals to decipher English words, irrespective of the person who voices the words, speaker verification systems heretofore developed are in an infant stage and are not as well developed. A common problem with speaker verification systems is that in order to be reliable, a positive verification of a speaker's voice must be made irrespective of background noise, differences in the spoken phrase and slight variations in the speaker's cadence, tone, inflection, etc.

From the foregoing, it can be seen that a need exists for an economical and reliable speaker verification system which provides a high degree of acceptance of true speakers, and a high degree of rejection of impostor speakers. There is an associated need for a speaker verification system which is user-friendly, portable, cost effective, and which can be implemented with program-driven computers or processors.

SUMMARY OF THE INVENTION

In accordance with the present invention, the disclosed speaker verification method and apparatus substantially reduces or eliminates the disadvantages and shortcomings associated with the prior art techniques. According to the invention, a fixed text speaker verification system is employed to promote consistency of speaker verification. In the preferred form of the invention, the speaker inputs an assigned identity by a telephone key pad, or the like, and is thereafter prompted to voice a fixed text statement comprising the identical identification code together with a pair of double-syllable geographical-related words. The technical advantage of a fixed text statement is consistency and thus enhanced verification. With the primary verification protocol, an optional secondary phrase may also be utilized, comprising a randomized five-digit sequence to assure that impostor audio recordings cannot be used to feign access.

The entire utterance of the speaker is converted into a digital data stream by conventional PCM/analog to digital conversion techniques. The digital data stream is, in turn, converted into frames of sampled speech values, each of which is transformed into a vector by linear predictive coding techniques. By utilizing linear predictive coding, a system model can be defined which would produce the sampled speech pattern. The ten linear predictor coefficients are transformed into 14 filter bank amplitudes using a simulated filter bank, defined on a mel-frequency scale. The energy vector is then rotated by the eigen vectors of a covariance matrix which is estimated by pooling together the covariance matrices of the filter bank energy vectors over an entire training data base, and scaled by the square root of the eigen value. The resulting vector comprises a principal spectral component characterized by statistically uncorrelated features, and ranked in decreasing order of statistical variance. The Euclidean distance in the principal spectral component domain is used to compare the reference and test feature sets. Time alignment of the reference template and the test template is accomplished by a dynamic time warping procedure. The resulting average frame distance is compared against a decision threshold to determine whether access by the speaker should be granted or denied.

The principal spectral components of the speaker's utterance are compared against the reference template which is formed by an identical utterance which was similarly processed during enrollment of the individual with the system. The principal spectral components derived from the reference frames are stored and utilized in the comparing procedure.

In accordance with an alternative embodiment of the invention, the speaker may be prompted with a secondary phrase comprising a randomized five-digit sequence. However, the speaker is enrolled in the system by uttering only a specified connected digit sequence. The problem of accurately segmenting the individual digits from the connected sequence is addressed by excising the digits 0–9 individually from the connected digit sequence for each of a number of male and female speakers. Each digit is marked at phonetically distinct boundaries and averaged across the speaker population, separately for the men and the women. Speaker independent templates are formed and used to segment the individual digits from a digit sequence for each speaker, producing a set of speaker dependent digit templates. This segmentation procedure is equivalent to a speaker independent speech recognition task. High speaker variability due to coarticulation among the neighboring digits is handled by carefully limiting the digit pairs in each sequence to those pairs with distinctive and recognizable boundaries.

A multi-phrase strategy is employed to provide the technical advantage of a high degree of true speaker acceptance without also increasing impostor acceptance. If a speaker fails a first attempt of verified identification, subsequent attempts are allowed in a single session. The speaker verification system processes the fixed text statement input on the subsequent attempts to produce a verification score which is compared against a threshold value. However, on the subsequent attempts, the threshold value is changed to provide a new criterion which, if met, allows access to the speaker. As the number of attempts given the speaker increases the number of decision steps also increases.

For inherently poor candidates of speaker verification, a technical advantage of the invention is presented in that the verification score is modified based on the person's past history. In other words, if a poor speaker produces a verification score greater than the preset threshold value, and if his average score up to the current session is greater than an average global score of a population of speakers, then his current verification score is adjusted in a direction such that when compared with the threshold value, one of the acceptance criteria might be met.

An additional technical advantage of the invention relates to a refinement in producing a reference template of a person's voice to enhance verification. On each positive verification of the system which results in acceptance of the person, the reference template is updated with the vectors which produced the positive verification. The updating is conducted by linearly averaging the principal spectral component (PSC) vectors of the reference template with the PSC vectors which produced the positive verification. The advantage of this feature is that as the system succeeds in verifying persons, the respective reference templates become more descriptive of the speaker's voices.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or functions throughout the views, and in which.

DETAILED DESCRIPTION OF THE INVENTION

Verification Equipment in General

Figure 1:
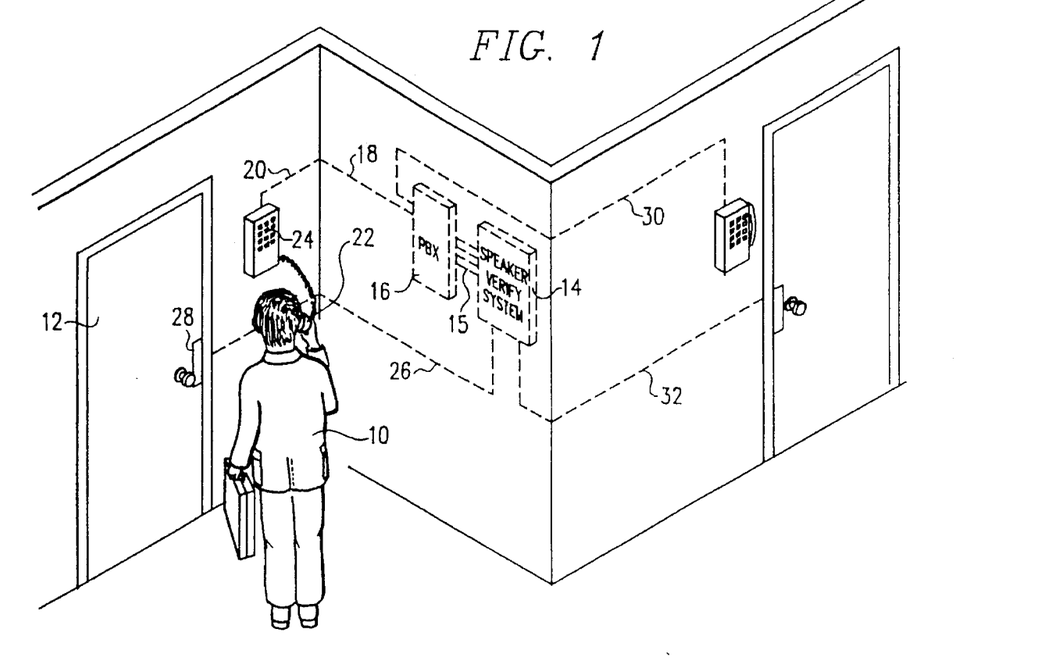
FIG. 1 illustrates an environment in which the invention may be advantageously practiced.

FIG. 1 illustrates an exemplary environment in which the present invention may be advantageously practiced. The invention is shown in connection with an access control application in which the identification of a person or speaker is required before gaining access, for example, through a doorway to a secure area. In such an environment, authorized personnel 10 may gain entrance through a door 12 to the secure area only after the person's identity has been clearly established. Heretofore, identification badges and security guards have been employed; however, with the present invention all this may be dispensed with in favor of a reliable and more cost effective system.

In the example, the present invention includes a speaker verification system 14 coupled by conductors 15 through a communication control system 16, and through a communication line 18 to a voice transducer, such as a standard telephone set 20. The communication control system 16 may be of the private branch exchange (PBX) type, or other type of system adapted for interfacing telephone equipment to the speaker identification system 14 of the invention. It is also contemplated that for other applications, the speaker verification system 14 can be employed with communication facilities other than shown.

The telephone set 20 conventionally includes a handset 22 and a keypad 24. Also coupled to the speaker verification system 14, via an electrical control line 26, is an electrically operated door lock mechanism 28. In response to voice signals, and the processing thereof, electrical signals generated by the speaker identification system 14 can be transmitted over the control line 26 to automatically operate the door latch mechanism 28 and allow entrance therethrough of the person 10. As shown by communication line 30 and electrical control line 32, the speaker verification system 14 can be used for controlling access to a number of other secure areas.

In a preferred form of the invention, the PBX equipment may comprise a PBX system manufactured and sold by the Panasonic Corporation, and the speaker verification system 14 comprises a TI Business-Pro Professional Computer with a TI-Speech Command System, and a signal processor identified by type TMS32010, manufactured by Texas Instruments, Incorporated. The speaker verification system 14 is programmed in a manner as detailed below to carry out the functions of the present invention.

The speaker verification system 14 can be utilized by the person 10 lifting the telephone receiver 22 off hook, whereupon the PBX 16 detects the off-hook condition and alerts the speaker verification system 14 accordingly. An identification prompt is returned to the person 10 by the speaker verification system 14. The person 10 seeking entry into the secure area then dials his personal non-secret identification code into the system 14 by the keypad 24. The speaker identification system 14 then receives these digits as an indication of the identification claimed by the person 10. Next, the verification system 14 outputs a response to the telephone 20, and thus to the handset 22, prompting the person 10 to verbally input the same identification code, as well as a statement, The identification code and the statement comprise a fixed test statement which must be voiced each time the person 10 uses the identification system. Other persons would use the same statement, but different identification codes assigned during enrollment with the system.

In the preferred form of the invention, and to be described in more detail below, the statement comprises two two-syllable words, the first one refers to a place and the second, a geographic feature. In response to the system prompt, the person 10 then voices the fixed text statement using his normal cadence, tone and rhythm. The speaker verification system 14 receives these speech signals, as transformed into electrical signals by the telephone set 18, and processes the electrical signals with a reference template of the person's voice to determine if access by the person 10 should be granted or denied.

The reference template with which the spoken words are compared comprises parameters previously generated and stored by the system 14 during an enrollment of the person 10, in which the person spoke the same identification code and statement. The parameters generated by the system during the enrollment are stored and thereafter function as a reference template against which subsequent comparison is made to determine speaker identification or verification.

It is to be understood that the environment of FIG. 1 is merely exemplary of an application of the invention. The invention may be characterized in many other forms and applications. For example, it is envisioned that the invention may be highly practical and useful in remote automatic electronic bank tellers and other systems and environments.

Verification Functions in General

Figure 2:
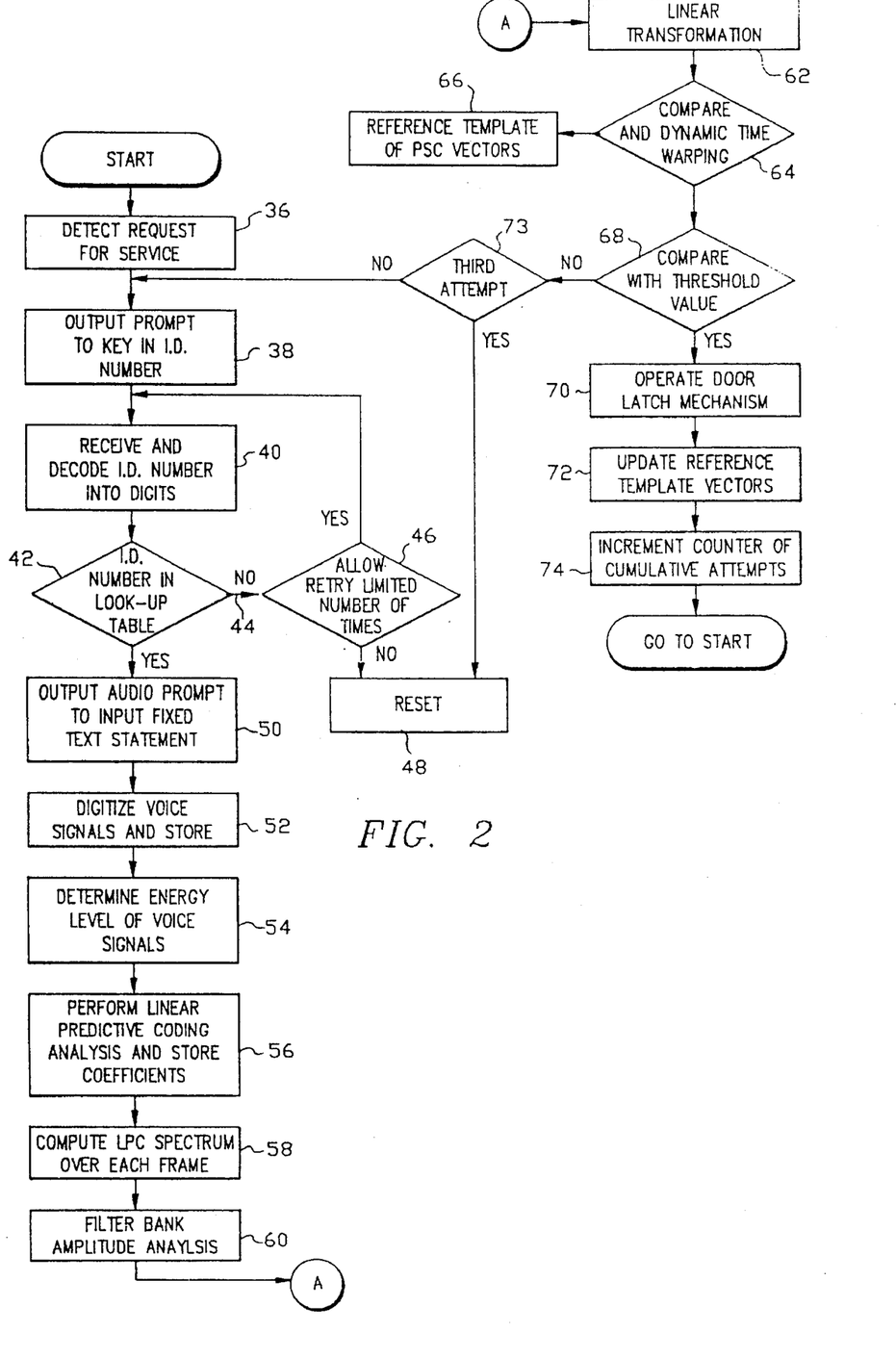
FIG. 2 illustrates the general programmed structure of a processor for carrying out the functions of the invention.

FIG. 2 depicts the basic programmed functions of the speaker verification system 14 to provide a highly accurate determination of true speaker identities, and a correspondingly high rejection of impostor speakers. As defined herein, an imposter speaker is a person who has not been enrolled with the system, and therefore has no associated reference template. An identification system with a high degree of discrimination between true and impostor speakers should therefore reject access to a very high percentage of impostors, such as 99.9 percent.

While a majority of the steps and functions disclosed herein are performed as programmed software routines, such functions could be carried out in electrical hardware as well. In the preferred form of the invention, the application software is implemented using "C" computer language, while the noted signal processor is programmed using the TMS32010 code. As noted by block 36 of FIG. 2, the speaker identification system 14 is activated in response to the detection of a request for service by the PBX 16. The PBX 16 operates in a conventional manner in that off-hook conditions of the telephone set 20 are detected on communication line 18, and indications thereof are signaled to the speaker verification system 14 over interconnecting conductors 15. The PBX 16 then provides a connection therethrough from the communication line 18 to the speaker verification system 14. The verification system 14 is thus electrically connected to the handset 22 of the telephone 20 so that the person 10 can communicate with the speaker verification system 14 via the handset 22 or the keypad 24.

In response to the request for service, the speaker verification system 14 outputs a verbal prompt 38 of the word "PIN" which indicates to the person 10 to input the personal identification number via the telephone set keypad 24. The person 10 then inputs the digits representative of the identification number previously assigned him during enrollment. Importantly, each person who has previously been enrolled with the speaker verification system 14 is assigned an identification number for primary identification as to the identity of the person. It is realized, however, that even a secret identification number does not provide a high degree of security, in that other non-authorized persons can gain access to the secure area by repeatedly guessing at identification numbers, or by wrongfully obtaining true identification numbers.

In any event, the person 10 responds to the system prompt by keying the assigned identification number into the speaker verification system 14 using the telephone keypad 24. This is noted at blocks 38 and 40 of the flow chart of FIG. 2. The electrical signals generated by the telephone set keypad 14 are converted into corresponding digit representations by a DTMF decoder in the event that the telephone set 20 is of the type provided with DTMF dialing. Otherwise, a dial pulse decoder can be utilized. As noted in program block the speaker verification system 14 then consults a look-up table to verify whether the identification number corresponds with a number previously assigned to any person enrolled and thus entitled to enter the secure area. The look-up table may reside in the memory of the signal processor of the speaker verification system and includes a listing of all the identification numbers assigned during enrollment of the authorized persons.

In the event an erroneous or wrong identification number was keyed by the person 10 into the verification system 14, a branch is made by the processor of the system, as noted by branch 44, to decision block 46. As indicated in decision block 46, the person is allowed only a certain number of attempts to input a correct speaker identification number. If the number of attempts, which define a session, have not exceeded a predetermined number, as indicated by the three attempts in the example, the processor is directed from decision block 46 back to the input of flow diagram block 38 where the person 10 is again requested to input his identification number. On the other hand, if the correct identification number was not keyed into the system 14 in the allowed number of times, decision block 46 redirects the system processor to a reset state 48, wherein further responses by the person 10 will not be processed until such person goes on hook. In the alternative, the speaker verification system 14 can be directed to the reset state 48 without the person 10 going on hook, but rather if the person keys the "#" symbol into the system In the event the identification number keyed into the system 14 by the person 10 exists in the look-up table, an affirmative verification is made, and the system 14 continues from block 42 to program flow block 50. At this juncture of the programmed instructions of the verification system 14, an audio output is directed to the person 10 to verbally input a fixed text statement of a predetermined arrangment of words. In order to enhance throughput and processing of the speaker identification system 14, the system audio output or prompt merely comprises an audio tone, or a "beep". Since persons enrolled with system 14 are well aware of the composition of the fixed text statement, there is no need to prompt the person with full instructions. Also, the throughput of the system abbreviated for processing of a number of persons is enhanced by prompts, in that less time is required to verify whether or not the speakers are true or impostors.

In the preferred form of the invention, the fixed text statement includes the personal identification code and a two word code, the first, a place name and the second, a geographical feature. For example, it has been found that a term such as "Berlin jungle" is easy to remember, and includes a syllabic content which, when processed by the verification system 14, provides a high degree of reliability in distinguishing true speakers from impostor speakers. The two-word statement comprises words which have a low degree of dialectical difference, and in which the emphasis is placed on the first syllable of each such word. Again, this type of word structure has been found to facilitate the verification accuracy of the invention.

After the speaker verification system 14 prompts the speaker according to program block 50, an analog-to-digital converter is activated to digitize the audio signals input into the verification system 14 by the person 10. This is noted at block 52 of the flow diagram. The fixed text statement input by the person 10 defines an utterance which is digitized at an eight kilohertz rate. The digital representation thereof is then temporarily stored in the memory of the verification system 14. The utterance input by the person 10 is then processed according to the speaker verification system 14 to determined if various parameters thereof correspond to similar parameters previously input and stored in the system as a reference template during initial enrollment of the person 10.

As indicated by flow diagram block 54, the digital representation of the person's utterance is processed as to its energy content to determine a start and end point thereof. During enrollment, the person is taught to speak the fixed text statement as a single connected phrase without an intervening break or pause. The determination of utterance end points will be discussed in more detail below. For the present purposes, it is sufficient to understand that the end points are determined generally by detecting the value of the utterance energy which is maintained above a preset threshold, without long periods of inactivity therebetween. The utterance between a start point and an end point is then considered as the fixed text statement. The fixed text statement is processed according to a linear prediction coding analysis, as denoted by flow diagram block 56. A linear predictive coding (LPC) analysis of all the digital data comprising the utterance is processed according to well-known LPC techniques to define coefficients of a system having an output characterized by the digitized utterance. As a result of the LPC analysis, a number of reflection coefficients (K values) are derived.

Linear predictive coding analysis techniques and methods of programming thereof are disclosed in a text entitled "Digital Processing of Speech Signals", by L. R. Rabiner and R. W. Schafer, Prentice Hall, Inc., Inglewood Cliffs, N.J., 1978, Chapter 8 thereof. Also to be discussed in more detail below, an LPC analysis is made over the digital signals of the entire utterance, which signals cover a period of 20 millisecond. Such a period of time defines a frame. For an 8 KHz sampling rate, 160 samples, or digital signals, are collected in the 20 millisecond frame. This time period represents a frame of digital signals over which individual LPC analyses are made. An LPC analysis is made over each frame of the utterance and the coefficients thereof are associated with a frame number and stored accordingly for subsequent processing.

The LPC parameter vector is transformed to a set of filter bank amplitudes using a simulated filter bank, defined on a mel-frequency scale. This function is depicted in program flow block 58 of FIG. 2. Software program techniques are utilized to provide a number of frequency responsive filters for determining the energy of the utterance in respective narrow frequency bands of a spectrum up to 4 kilohertz. In practice, fourteen filters are utilized, and spaced apart in the frequency domain, on a mel-frequency scale. As a result of processing each frame of digital signals through the noted filter bank, an output is produced which comprises a vector of fourteen parameters. The filter bank analysis is indicated at block 60 of the flow diagram.

A linear transformation of the fourteen parameter vector of the filter bank output of each frame is then performed by the speaker verification system as noted at program block 62. In the preferred form of the invention, a linear transformation which produces principal spectral components (PSC) is utilized. Such a transformation is described in "Real-time Recognition of Spoken Words", by Pols L. C. W. IEEE Transactions on computers, Vol. C-20, September, 1971.

The linear transformation, otherwise termed "orthogonalization" produces a set of parameters which are mutually uncorrelated, and which are arranged in an order from a high variance to a low variance. While the linear transformation produces a corresponding fourteen parameter vector, only ten vectors having the highest variance are maintained, while the other four vectors are discarded. The ten principal spectral components comprise a vector which is considered to be characteristic of the fixed text statement, and thus characteristic or peculiar to the person 10. In other words, the principal spectral component vector comprises digital indicia representative of the particular speaker 10.

A comparison 64 is made of the principal spectral component vector representative of the person 10 with a reference PSC template 66 previously formed and stored during enrollment of the true speaker 10. The comparison 64 is made between the ten parameter PSC vector developed from the spoken words of the speaker 10, and the reference template 66 to yield a numerical result indicative of the quality of a match or mismatch therebetween. The utterance input by the person 10 into the verification system 14 in attempting to gain entry into the secure area is defined herein as a test utterance. The comparison function 64 is carried in a manner utilizing a dynamic time warping technique to take into consideration a possible different number of frames which may have been gathered in collecting the test utterance of the person 10, and the frames defining the utterance of the speaker during enrollment. For example, if during the test utterance and during the enrollment, the speaker 10 voiced the same fixed text statement in different periods of time, a different number of frames would be developed.

As depicted in program block 68, the numerical result of the comparison and dynamic time warping 64 is measured with respect to a threshold number. The threshold number is derived from pilot data previously developed in conjunction with the system. Generally, if the numerical comparison result is less than the threshold, access is granted the person 10. On the other hand, if the numerical result of the comparison 64 is greater than the threshold number, access of the person 10 is denied. As noted above, the speaker verification system 14 is connected to the door lock mechanism 28 by the control line 26. Thus, on granting access to the person 10, an appropriate electrical signal is generated on the line 26 by the speaker verification system 14. The unlocking 70 of the door mechanism 28 can thus effect access to the secure area. Such electrical door latch mechanisms 28 are conventionally available.

On the granting access to the person 10, the verification system 14 is redirected to a program block 72 where the PSC vectors of the reference template are updated. The updating is accomplished by linearly averaging the reference template PSC vectors with the test PSC vectors generated by the dynamic time warping function 64. Importantly, the updating occurs only on successful attempts of access by the person 10.

In the event the numerical result is greater than the threshold number, the program flow of the verification system 14 is branched from block 68 to block 73. In decision block 73 the number of attempts by the person 10 to gain entry is tested. The identification system 14 determines whether a prescribed number of attempts have been made by the person 10 to establish a positive identification in a single session. While any number of attempts could be programmed, it has been found that system accuracy and reliability are enhanced when only three successive attempts per session are given to the person 10 to establish a positive identification. A first attempt or even a second attempt to establish a positive identification by the person 10 may result in denial of access due to inappropriate input of the fixed text statement. For example, if the person coughs, pauses too long or otherwise varies the words the fixed text statement, such perturbations will be either considered as part of the utterance or the utterance will be truncated on the occurrence of intervening pauses which are too long. On the first and second retry, the identification system 14 branches from program block 73 to block 40 where the person must reenter the identification number via the keypad 14 and again enter the voiced fixed text statement. However, on a third retry after failure of the first two attempts, the system branches to the reset state 48 where the person 10 must then go on hook or dial the "#" to reinitiate the identification sequence. On such retries, the speaker verification system 14 does not output a prompt to the person 10.

Figure 3:
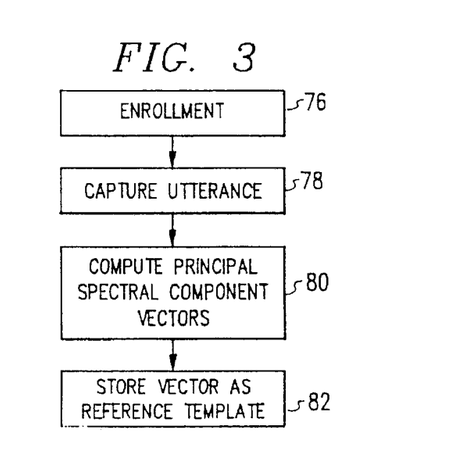
FIG. 3 is a flow diagram illustrating the enrollment procedures for deriving a reference template of a speaker desiring identification.

FIG. 3 illustrates the enrollment procedure of individuals whose identity is stored in the identity verification system 14 in nature of a speech signature or reference template. As noted in the flow chart of FIG. 3, the enrollment 76 is initiated by assigning the person an identification number which is to be keyed into the system 14 via the telephone set 20 on attempts to enter the secure premises. The identification number is also registered within the data base of the identification system 14. In addition, the person 10 is familiarized with the fixed text statement, insofar as the manner in which it should be voiced. The reliability of speaker identification by the system 14 can be facilitated by the individual learning how to voice the fixed text statement consistently, both during enrollment and thereafter when entry to the secure premises is desired. The person 10 also learns that the voiced fixed text statement should be spoken as a natural sequence of a phrase comprising the identification code, and two code words.

The fixed text statement represents an utterance which is captured 78 and input into the identification system 14. A principal spectral component vector is derived from the utterance, as described above in connection with the speech processing of the test utterance to determine the person's identity. The principal spectral component vector is then permanently stored 82 in the data base of the verification system 14 as a reference template which forms the signature of the person 10.

Figure 4:
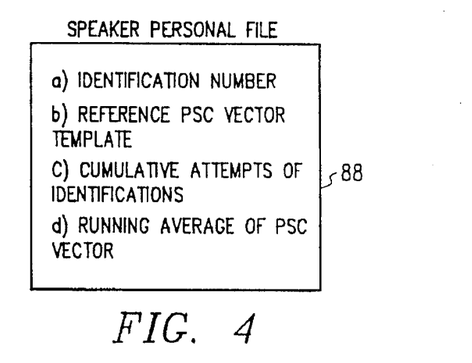
FIG. 4 illustrates the elements of a speaker personal file.

The speaker verification system 14 also includes a counter which registers the cumulative number of attempts by the person to use the system after enrollment for identification. This is illustrated in FIG. 4 which depicts a speaker personal file. In actual practice, the counting indicated is performed as a software routine with the counter illustrated in FIG. 2. In this manner, and to be described in more detail below, a personal file of each speaker is maintained by the verification system 14, which file includes the number of attempts of each speaker identification. After the initial enrollment in which a first PSC vector is stored as a reference template 82, the person 10 is requested to repeat the utterance an additional nominal number of times, such as four, so that additional PSC vectors of the same utterance can be derived. As indicated in the file of FIG. 4, an average of the ten-parameter PSC vectors is computed and used to update the reference template. In this manner, the person's signature represents a PSC vector average of the five utterances of the same fixed text statement made during the enrollment period. The manner in which the PSC vectors are averaged will be discussed more fully below.

FIG. 4 depicts the various elements maintained in a personal file 88 of each speaker enrolled in the verification system 14. The speaker personal file 88 is maintained in a software table, and can be updated accordingly. Particularly, the personal file 88 of each speaker includes the identification number assigned the person during enrollment and which is used subsequently for telephone keypad entry into the system, as well as voiced into the system. The personal file 88 also includes the reference PSC template of the averaged PSC vectors derived during enrollment, including the averaging which occurs during subsequent attempts by the person to gain access. An additional element of the personal file 88 includes the counter contents which represents the cumulative attempts of identification by the speaker who desires entry into the secure area. The cumulative number of attempts is useful in a speaker normalization routine which improves the reliability for assessing accurate identifications of true speakers. Lastly, the personal file 88 of each speaker includes a running average of numerical results derived from the dynamic time warping comparison between a test utterance PSC vector and the reference PSC vector.

Figure 5:
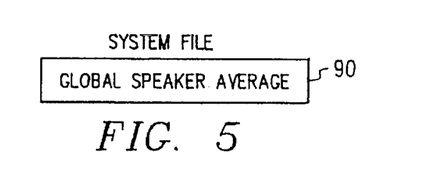
FIG. 5 illustrates the format of a system file comprising a global speaker average.

Among many other parameters, the speaker verification system 14 includes a file 90, as noted in FIG. 5, which includes a global speaker average of numerical results. The global speaker average is derived during the generation of a pilot data base in which the numerical results generated by each person enrolled in the system 14 is tallied. The global speaker average of yields an indication of an overall numerical result average of a population of persons, including male and female, voicing different fixed text statements, within the same protocol. Such global average is also used in the noted speaker normalization routine.

Detailed Verification Functions and Equipment

Figure 6:
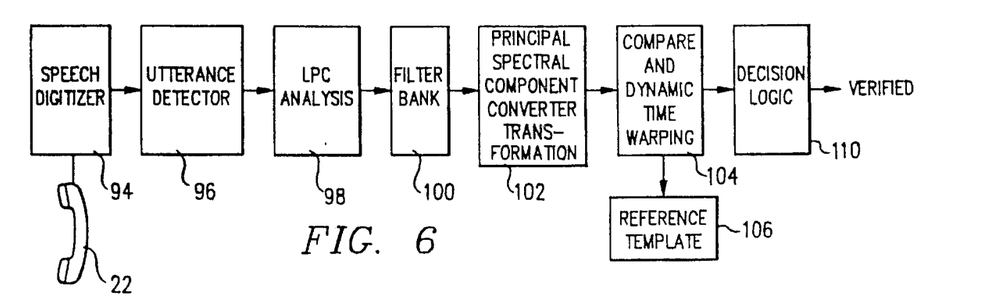
FIG. 6 illustrates a block diagram of the major functions of the invention.

The major structural components of the speaker verification system 14 in carrying out the speaker verification routine of FIG. 2 are illustrated in more detail in FIG. 6. The analog audio signals input by the speaker 10 over the telephone handset 22 are coupled through the telephone set 20 and the PBX 16 via interconnecting lines 18 and 15, to the speaker verification system 14. Audio analog signals input by the speaker 10 are digitized by a speech digitizer 94 comprising a conventionally available Analog to Digital Converter. The speech digitizer 94 samples the input analog signals at a 8 KHz rate and produces a digital output having a value representative of the amplitude of each such sample. Also, the speech digitizer 94 includes a low pass filter for passing only those audio frequencies below about 4 KHz. The digital signals generated by the speech digitizer 94 are buffered to temporarily store the digital values.

The output of the speech digitizer 94 is connected to an utterance detector 96 which analyses the digital bit stream output by the speech digitizer 94. In the preferred form of the invention, the utterance detector 96 is a program routine in the identification system 14 which analyzes the digitized signals of the utterance, and which computes the maximum energy level of the utterance for establishing a threshold related to such maximum energy. Also, the utterance detector 96 is responsive to a preset time interval such that if the energy of a number of digitized values falls below the energy threshold for the preset period of time, a start or end point of the utterance is defined. The utterance detector 96 computes the energy of the utterance according to the following equation:

$$\sum_{1}^{n} [S(n)]^2$$

where s represents the amplitude of a digitized sample and n equals the number of samples. The threshold energy level is set at a nominal value with regard to the maximum energy of the utterance, for example ⅛ th of the maximum energy detected. Also, the energy values which fall below the threshold are counted to determine possible start and end points of the utterance.

In the preferred form of the invention, if it is found that the energy values fall below such energy threshold for about 500 milliseconds, it is considered that such interval represents a start point before an utterance, or an end point after the utterance. As noted above, during enrollment the speakers are taught to voice the identification code and the phrase of the statement as one concatenation of words. The utterance detector will detect the pause before the start of the identification code and the pause after the two-word phrase. With this arrangement, the speaker verification system 14 can process the entire utterance to form frames of principal spectral component vectors which are compared against the reference template associated with the personal file 88 of the speaker.

The series of digitized signals comprising the utterance, and the start and stop point detected by the utterance detector 96, are processed by a linear prediction coding analyzer 98 to produce LPC vectors associated with 20 millisecond frame segments. The linear prediction coding analysis carried out by the verification system 14 defines a system model based upon the characteristics of the utterance. Such LPC analysis assumes that the speech characteristics do not change significantly, in a statistical sense, over short periods of time. Thus, 20 millisecond periods have been selected to define frame periods to process the voice information. A 10 msec. overlap between adjacent analysis windows is maintained to preserve a smooth transition of model parameters across frame boundaries.

Figure 7:
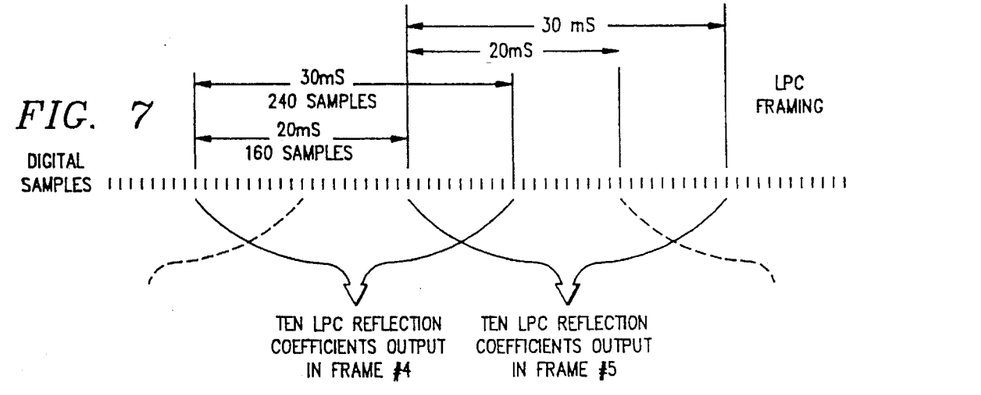
FIG. 7 illustrates the framing technique utilized with linear predictive coding.

FIG. 7 illustrates the general operation of the LPC analyzer 98 over the frame intervals of the digitized speech data to provide a series of LPC coefficients representative of the fixed text statement. As can be seen from FIG. 7, ten LPC coefficients are derived from a 30 millisecond window which includes overlapping digitized data of 10 milliseconds from, for example, window three, and digitized data from 10 milliseconds of window five. In like manner, the ten LPC coefficients associated with window 5 include digitized information common with that of frame 4 and frame 6. In this manner, informational content of the speech signal is carried on from one frame to another frame to optimize the LPC analysis and provide coefficients more characteristic of the model.

As fully described in above-identified text concerning linear predictive coding analysis, a model according to the following equation is formed:

$$X_n = a_1 x_{n-1} + a_2 x_{n-2} + \ldots + a_p x_{n-p}$$

where x are the sample amplitudes and $a_1 - a_p$ are the coefficients. In essence, the "a" coefficients describe the system model whose output is known, and the determination is to be made as to characteristics of a system that produced the output. According to conventional linear predictive coding analysis, the coefficients are determined such that the squared differences, or Euclidean distance, between the actual speech sample and the predicted speech sample is minimized. Reflection coefficients are derived which characterize the "a" coefficients, and thus the system model. The reflection coefficients, generally designated by the alphabet k, identify a system whose output is:

$$a_0 = k_1 a_1 + k_2 a_2 \ldots k_{10} a_{10}.$$

An LPC analysis predictor is thereby defined with the derived reflection coefficient values of the digitized signal.

Figure 8:
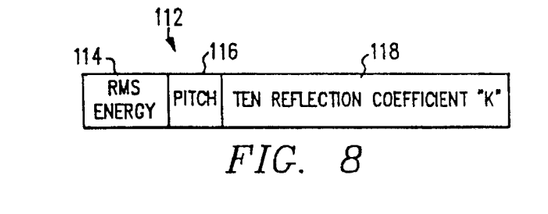
FIG. 8 illustrates the format of parameter arrangement in a system frame interval.

With reference again to FIG. 6, the ten LPC reflection coefficients of each frame are output to a filter bank 100. Each frame is characterized by the speaker verification system 14 according to the format shown in FIG. 8. The illustrated frame 112 includes a first segment 114 having the maximum RMS energy indication, a second segment 116 which holds the pitch or frequency components of the frame, and a third segment 118 having ten reflection coefficients (k values). Various standard algorithms are available for defining energy and pitch components of digitized audio signals. Each frame is thus characterized by twelve parameters, ten of which are in segment 114, and one each of which are associated with segments 116 and 118. Also the LPC analysis of the entire utterance, which in the preferred embodiment is about 2.5 seconds long, reduces about 20,000 digitized samples down to 125 frames, each with ten reflection coefficients.

Figure 9:
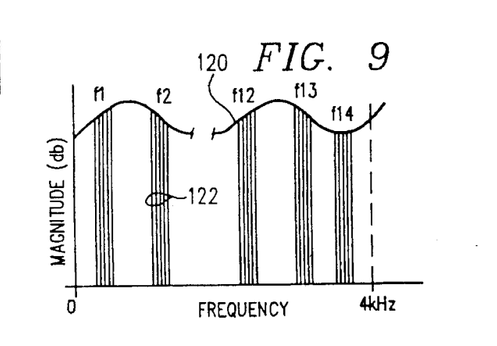
FIG. 9 graphically illustrates the technique for producing filter bank vectors.

The spectrum of the reflection coefficients is then computed by arranging the magnitude of the spectral components thereof as shown in FIG. 9. The spectrum illustrated is computed using classical Fourier transforms of the ten-parameter LPC coefficients, on a frame by frame basis. FIG. 9 illustrates the result of the frame on which the Fourier transform was applied. The curve 120 symbolizes the spectral magnitudes of the signal from 0 to 4 KHz. The vertical axis represents the magnitude of the spectral components in decibels (db). The functions of the illustrated filter bank 100 (FIG. 6) are conducted with standard software routines such that the spectrum of FIG. 9 is sampled five times, as indicated by 112, at fourteen different frequency locations along the 4 kilohertz spectrum. The fourteen locations are selected beginning around 100 Hz and spaced linearly for a distance, and then spaced logarithmically up to 4 kilohertz. This scheme resembles the manner in which the human ear is responsive to sounds, and thus facilitates the accuracy of the system. At each of the fourteen locations where five samples are taken, an average is made to define fourteen distinct parameters of the spectrum. Next, the RMS energy stored in the frame segment 116 (FIG. 8) is used to normalize the fourteen filter bank output vectors $f_1 - f_{14}$. The output of the filter bank 100 is defined by fourteen filter bank vectors $f_1-f_{14}$. Again, a fourteen-parameter filter bank vector is output in each 20 millisecond frame.

The filter bank vector $f_1-f_{14}$ is output to a principal spectral component converter 102 where the fourteen filter bank vectors $f_1-f_{14}$ are converted into another set of vectors comprising principal spectral component vectors such that each feature of the filter bank vector set is uncorrelated with the other filter bank vectors. Thus, the same amount of information can be represented as another set of vectors, or features, which are not dependent upon each other, and thus can be viewed as orthogonal. The conversion of the fourteen-parameter filter bank amplitude vector undergoes a linear transformation to produce principal spectral component vectors. According to the Karhunen-Loeve transform identified above, the linear fourteen-parameter filter bank amplitude vector is multiplied by a two-dimensional 14×14 matrix which is comprised of eigen vectors of a covariance matrix. The matrix multiplication of the linear filter bank amplitude vector by the eigen vector matrix results in a set of principal spectral component parameters according to the following:

$$\begin{bmatrix} e_1 \ldots \\ \ldots e_{14} \end{bmatrix} \begin{bmatrix} f_1 \\ f_{14} \end{bmatrix} = \begin{bmatrix} P_1 \\ P_{14} \end{bmatrix}$$

The output of the linear transformation results in the PSC vector $P_1-P_{14}$ which represents a set of features uncorrelated with respect to each other. Again, the linear transformation of the filter bank vector by the principal spectral component converter 102 provides a fourteen-parameter vector for each 20 millisecond frame. Further, the principal spectral component converter 102 arranges the PSC vector parameters ($P_1-P_{14}$) in an order of decreasing variance. In other words, the PSC vectors are arranged in a series with those of a high degree of variance toward one end and those with the lowest degree of variance at the other end of the range. Then, the ten PSC vector parameters with the highest degree of variance are selected, while the remaining four least significant PSC vectors parameters are discarded. A ten parameter PSC vector is thus output to the comparator and dynamic time warping function 104 of the invention. Each PSC vector parameter is thus completely unpredictable with respect to each other, and thus highly uncorrelated. Importantly, all frames with the ten-parameter PSC vectors comprise a speech signature of the person 10 who voiced the test utterance.

The compare and dynamic time warping arrangement 104 is utilized for comparing the voiced fixed text statement with a reference template 106, which reference also includes frames of ten-parameter PSC vectors developed during enrollment of the person. The dynamic time warping function 104 essentially determines a Euclidean distance between the PSC vectors of each test frame and the PSC vectors of each frame of the reference template 106 developed during enrollment. Dynamic time warping is essential in that there may be more or fewer frames of PSC vectors in the reference template 106 than developed as a result of the test utterance of the fixed text statement. In other words, even though the fixed text statement is the same during enrollment and when trying to gain access to the secure premise, the speaker 10 may take a slightly longer or a shorter period of time to verbalize the utterance.

Figure 10:
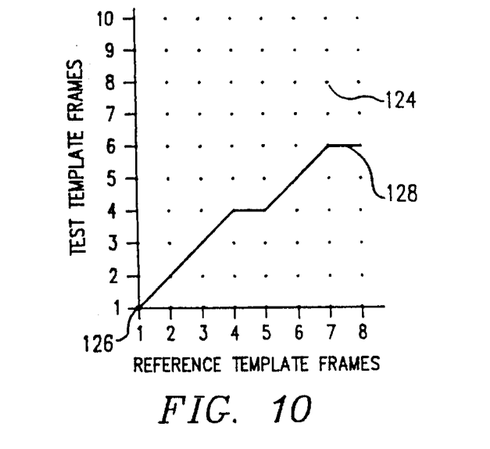
FIG. 10 graphically illustrates a technique for dynamic time warping speaker test frames with reference template frames.

FIG. 10 graphically illustrates an exemplary reference template having eight frames located along a horizontal axis, and a test template having ten frames of PSC vectors arranged along a vertical axis. Next, the Euclidean distance is determined between each frame of the reference template and each frame of the test template. The PSC vector of reference template number one is found by determining the Euclidean distance between the PSC vector of reference template 1, and the PSC vectors of test templates 1, and 2–10. In like manner, the Euclidean distance of frame two of the reference template is found by again comparing it with the PSC vectors of test template 1, and 2–10. In this manner, an 8×10 matrix of elements is formed, wherein each element, as illustrated by reference character 124, represents the distance between a test frame j and the reference frame i.

The dynamic time warping algorithm then seeks a minimum path through the matrix by starting at the matrix element 126 and proceeding to the next neighboring lowest value element. The resulting path 128 represents the lowest cost path and identifies 8 of the 10 test frames to be ultimately used. The total distance between the test template and the reference template is the sum of the errors of the path. In essence, this makes the comparison between the reference template and the test template. The details of dynamic time warping are set forth in the book, "Digital Processing of Speech Signals", Rabiner and Schafer, Prentice Hall, 1975.

The comparison of the PSC vectors of the reference template with the PSC vectors of the test template is completed by summing the values of the least cost curve 128 of FIG. 10, and averaging such sum by the total duration of the test utterance. This yields a number or numerical result which is indicative of the degree of match between the characteristics of the speaker's voice used in developing the reference template during enrollment, and the voice which uttered the fixed text statement in an attempt to enter the secure premises.

The determination as to whether the speaker 10 should be granted or denied access is carried out by matching or comparing the numerical result with a threshold number. The threshold number is derived from a distribution bistrogram developed during the accumulation of pilot data for assessing the ability of the system to accept true speakers and to reject impostor speakers, with each such type of speaker voicing different fixed text statements, with the same phrase structure described earlier. The pilot data was developed using twenty men and twenty women over 20 sessions. The distribution histrogram of FIG. 11 was developed during the derivation of the pilot data, wherein the vertical axis represents the numerical result which defines a number of entries, and the horizonal axis represents the verification score. The curve 130 represents the distribution of true speakers, as a function of verification score, which curve 132 represents impostor speakers, also as a function of the verification score.

Figure 11:
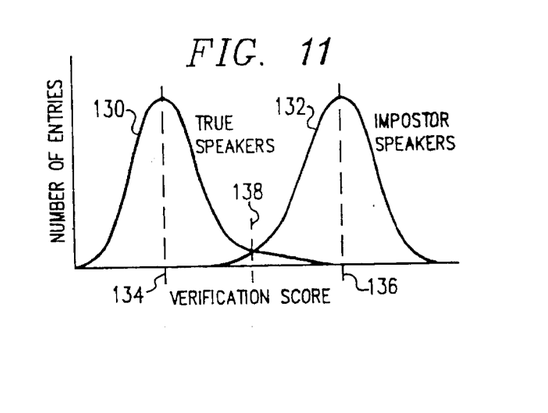
FIG. 11 illustrates a histogram of a true speaker and impostor speaker verification scores for the pilot test data.

A verification score as indicated by position 134 on the horizontal axis indicates that the true speakers attained a generally common verification score, but a threshold set at such value would effectively reject many true speakers having higher verification scores. In like manner, a verification score indicated by reference character 136 would effectively allow a large number of impostors to gain entry into the secure area. A verification score selected on the horizontal axis at a position indicated by reference character 138 would accept a high number of true speakers, and reject a high number of impostor speakers. Essentially, such a verification score located at the crossover points of curves 130 and 132 would be effective in accepting as many impostors as the system would reject true speakers. Significantly, there is very little overlap between curves 130 and 132, thus indicating a system with a high degree of discrimination between true speakers and impostor speakers.

Figure 12:
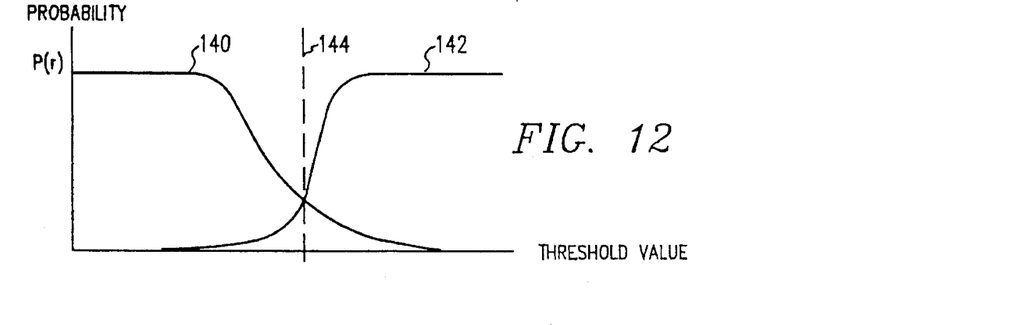
FIG. 12 is a cumulative distribution curve utilizing the data of FIG. 11.

FIG. 12 is a cumulative histogram of the data noted in FIG. 11. In FIG. 12, the horizontal axis represents a threshold to be selected for use by the speaker verification system 14 for deciding whether to accept or reject a speaker based on a comparison between the reference template and the test template derived from the currently spoken fixed text statement. The vertical axis of the graph of FIG. 12 is the probability of having a score greater than a selected threshold for true speakers or the probability of having a score less than a selected threshold for an impostor. Curve 140 represents the cumulative histogram curve of true speakers, while curve 142 is representative of the impostor speakers. In accordance with a performance criterion, such that no more than a 1% rejection of true speakers, and no more than a 0.1% acceptance of impostor speakers, a corresponding threshold value is selected from the FIG. 12 graph. A threshold value indicated on the horizontal axis in FIG. 12, 144 would yield an impostor acceptance rate that is equal to the true speaker rejection rate.

A decision strategy using the thresholds determined as above is implemented in the decision logic 110 of FIG. 6. According to the decision logic 110, any person, whether an impostor or a true speaker, who voiced the fixed text statement and whose derived verification score results in a score less than the threshold was accepted by the system. On the other hand, any verification score above the threshold would result in a rejection, and thus denial of entry of the person 10 into the secure premises.

In accordance with another feature of the invention, the decision logic 110 includes a multi-phrase strategy in which the person 10 desiring access to the secure area is given plural attempts in a single session if initial attempts are denied. As noted above, on the first attempt to gain entry, and in response to the voiced fixed text statement, if the output of the dynamic time warping comparator produces a numerical result ($d_1$) which is less than or equal to the preset threshold access is granted. The following condition then exists:

$$d_1 \leq \theta_1 \text{ access granted}$$

where $d_1$ is the output of the dynamic time warping comparator, i.e., the numerical result, and $\theta_1$ is the threshold score (for example 220). In the event that $d_1$ is greater than $\theta_1$, a comparison mismatch exists and access of the person 10 to the secure premises is denied. The rejection is mathematically represented as:

$$d_1 > \theta_1 \text{ access denied}$$

However, in accordance with the invention and on the first denial, the person 10 is allowed a second attempt to gain access to the secure premises. The person 10 again inputs into the speaker verification system 14 the voiced fixed text statement which generates another numerical result from the dynamic time warping comparator, designated as $d_2$. Verification and acceptance of the speaker 10 on the second attempt can be established if the following criteria is satisfied:

(a) $\dfrac{(d_1 + d_2)}{2} \leq \theta_2$ (b) $d_2 \leq \theta_{1x}$ where $\theta_2$ is greater than $\theta_1$, and $\theta_{1x}$ is less than $\theta_1$. In practice, $\theta_2$ is a threshold value derived from distribution data of persons encountering a second attempt and may be a number in the neighborhood of about 252. $\theta_{1x}$ may be a number in the neighborhood of about 216. Therefore, the speaker 10 may be accepted if the average of the numerical results $d_1$ and $d_2$ is less than 252, or if the $d_2$ numerical result itself is less than $\theta_{1x}$.

In the event the verification score $d_2$ does not satisfy any of the two constraints set forth above, access is denied and a third attempt is granted the speaker 10 to gain access to the secure premises. The speaker 10 then has an additional chance for acceptance if a third verification score $d_3$ satisfies any one of the following four constraints:

(a) $\dfrac{d_1 + d_3}{2} \leq \theta_{2x}$ (b) $\dfrac{d_2 + d_3}{2} \leq \theta_{2x}$ (c) $\dfrac{d_1 + d_2 + d_3}{3} \leq \theta_3$ (d) $d_3 \leq \theta_{1x}$ The threshold numbers associated with $\theta_{2x}$ and $\theta_3$ are derived from yet other cumulative distributions of persons attempting to gain entry by the exemplary verification system 14 on the third attempt. In practice, threshold values of the following magnitudes have been found to provide a high degree of reliability and satisfy the criterion noted above:

$$\theta_{1x} < \theta_1 < \theta_{2x} < \theta_2 < \theta_3$$

In the preferred embodiment of the invention, a session comprising three attempts is alloted the person 10 before being finally rejected. Of course, the person 10 may then hang up, or dial "#", 1 and initiate another vertification session.

Reference Template Updating

In accordance with yet another feature of the invention, on each successful verification of speaker identity by the verification system 14, the reference PSC vector template in the personnel file 88 of the speaker 10 is updated by averaging the reference PSC vectors with the verified test PSC vectors. The reference PSC vector template is updated according to the linear averaging technique, as specified by the following equation:

$$PSC_{updated} = (1-\propto) PSC_{ref} + (\propto) PSC_{test}$$

where $\propto \min \leq \propto \leq \propto \max$, typically $\propto\min = 1/20$ and $\propto\max = 1/5$, where ($\propto$) equals $1/N$, and where N equals the number of sessions in which the speaker 10 attempts to gain access to the secure premises using the speaker identification system 14. As noted above, during the enrollment phase of the system, the speaker undergoes five sessions in which the PSC vectors are averaged to provide more representative vectors of the speaker's voice. On each subsequent session when the speaker actually desires to enter the secure premises, the value of N is incremented and the linear averaging equation is utilized to update the reference PSC vector template. Importantly, the reference PSC vectors are updated only on successful verifications during first, second or third attempts, as described above. The continual updating of the reference PSC vector template increases the reliability of accepting true speakers by changing the vector parameter in a direction which more accurately represents the characteristics of the speaker's voice. Also as noted above (FIG. 4), a totalized number of verification sessions are maintained in the speaker personal file.

Speaker Normalization

In accordance with another feature of the invention, a speaker normalization function is utilized to increase the system acceptance of true speakers, especially those inherently poor candidates for speaker verification. As can be appreciated, the accuracy of speaker verification depends in a large part on how well defined the reference template is, how consistent the speaker is in voicing the fixed text statement, and the quality of the environment during enrollment and during the test situation. Speakers who are inherently poor candidates for verification tend to be inconsistent in voicing the phrase, either as to cadence, rhythm, or other vocal idiosyncrasies. On the other hand, good speaker candidates tend to yield test PSC vector parameters which are very close to the reference PSC vector parameters.

The speaker normalization function of the invention can be utilized in conjunction with the program flow described above. In developing the pilot test data described above, a global average of the verification scores is computed. The global average comprises an average of the verification scores arising from all true speakers making attempts to gain entry by way of the speaker verification system 14. For purposes of example, assume that the verification score threshold of the system 14 is 220, as described above, and that the global average is 160. The inherently poor speaker candidates may have verification scores on the average 240–270 which, according to the example, would not be accepted by the system 14. However, the fact that such candidates have consistently poor verification scores is utilized in an attempt to modified the system to grant acceptance of such speakers, notwithstanding the actual failing verification score.

According to the speaker normalization function of the invention, the acceptance or rejection of an inherently poor speaker is judged with respect to the global average. The speaker normalization function operates as follows. Assume the verification score of a particular session of the speaker is equal to 230, and the cumulative average of the speaker up to the present session is equal to 250 and the global average is 160. Under these circumstances, the inherently poor speaker has attained a verification score much better than his average but yet above the 220 threshold number. The verification score of the speaker is modified according to the following equation:

$$\frac{\text{Modified}}{\text{Score}} = \frac{\text{Verification score of test session}}{SQRT \text{ (speaker average score} \div \text{global average)}}$$

When the test verification score of the inherently poor speaker is processed according to the noted equation, such score is divided by a number somewhat larger than unity to define a new lower verification score which might be less than the threshold of 220. If such is the case, the speaker verification system 14 will grant access to the speaker 10, even though such access would not otherwise be granted without use of the speaker normalization function. While the speaker normalization technique may work against a true speaker or favor an impostor in isolated cases, on the average, it allows greater acceptance of true speakers without increasing the impostor acceptance rate significantly.

Randomized Secondary Phrase

Yet another important feature of the invention is the optional provision of a randomized phrase which prevents an impostor from gaining acceptance through the use of the speaker verification system 14 by using taped audio recordings, or the like. While the fixed text statement described above promotes consistency and thus a high degree of system acceptance of true speakers, the randomized phrase is utilized so that an unknown and a constantly changing concatenation of words must be voiced by the speaker during attempted access to the secure environment. However, a problem arises in the comparing or matching process in which the test utterance of the randomized phrase is compared with an associated reference template. It would be much too burdensome to require speakers to enroll with the system by voicing every combination of a number set of digits or words. It is also important to realize that it is difficult to perform such comparison if the persons were to enroll by voicing each individual digit in a disconnected, isolated fashion. It is well known and recognized that words or syllables voiced in a disconnected fashion may be phonetically different than when chained together. Such an effect is known as coarticulation where the voicing of one word or syllable may be changed depending on the enunciation of a prior or succeeding adjacent word or syllable. For example, the digit "3" may be voiced differently depending upon whether it is followed by a "2" or an "8". Whereas, if a person were to speak the digits "0" to "9" individually in a disconnected manner, the sounds would be substantially the same irrespective of the sequence.

According to the invention, the digits "0" through "9" are utilized in the formation of the randomized phrase, but such digits are enrolled by speaking such digits in a connected manner, and in a particular sequence. By use of the phonetics associated with each such digit, two sets of five digits are defined which minimizes the coarticulation effects. The first set of digits "1,0,3,5,8" and a second set of digits "9,7,2,4,6" have been found to have minimal coarticulation effects when voiced in a connected manner. Therefore, a speaker's voice signature is entered into the verification system 14 during enrollment by voicing the two noted sets of digits, each in a connected manner. The vocal characteristics of the various digits are then used for matching purposes with the randomized digits which the speaker must vocally input into the speaker verification system 14 when attempting to gain access to the secure area. It is important to realize that the program flow of FIG. 2 is modified somewhat to provide an audio prompt to the speaker to input the fixed text statement, as well as a prompt indicating the randomized phrase of digits. The speaker verification system 14 continuously provides an randomized arrangement of digits which change between speakers 10 using the verification system 14, and even change between different attempts of a session of the same speaker.

Figure 13:
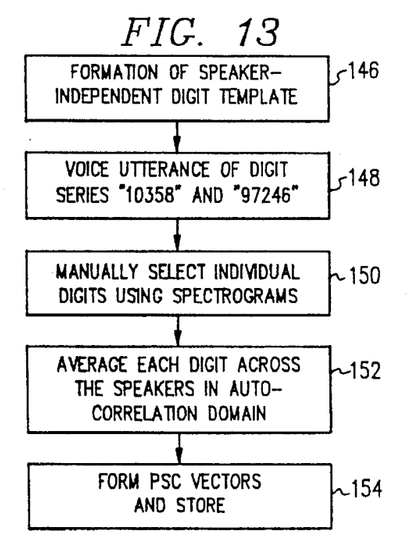
FIG. 13 illustrates a flow diagram of an alternative form of the invention employing a randomized digit sequence.

The following discussion describes, together with the program flow chart of FIG. 13, the manner in which individual templates of each of the digits is formed, using the two sets of noted digits voiced in a connected fashion during enrollment. Program flow blocks 146 and 148 are exemplary. During enrollment, a number of spectrograms are formed of the voiced sets of digits of forty persons who formed the pilot data base. The spectrograms were observed with respect to frequency, time and spectral magnitude parameters, to manually pick out the individual digits defined between phonemic boundaries. Individual files were thus established as to each of the ten digits, and each of the forty persons.

Autocorrelation coefficients are then derived for each of the digits of each of the persons. For each digit, the autocorrelation function was averaged among all the forty persons. As performed above, the autocorrelation coefficients were performed on a 20 millisecond frame basis. As a result, the digit, for example "1", is defined which is generally representative of each of the forty speakers. The same procedure is conducted for each of the digits to derive an average template of each of the ten digits. The ten templates, which are speaker-independent digit templates, are then stored in the speaker verification system 14.

As noted in block 150 of FIG. 13, the digits are manually selected from the spectrogram. As noted in flow diagram block 152, a linear average of each digit is taken across the speakers in an autocorrelation domain. PSC vectors are then formed for each of the ten digits and are stored 154 in a reference template. The PSC vectors are generated in a manner substantially identical to that described above. Importantly, the reference digits templates are speaker-independent, as the forty persons used as subjects to form the template need not be the persons who will be subsequently enrolled.

Figure 14:
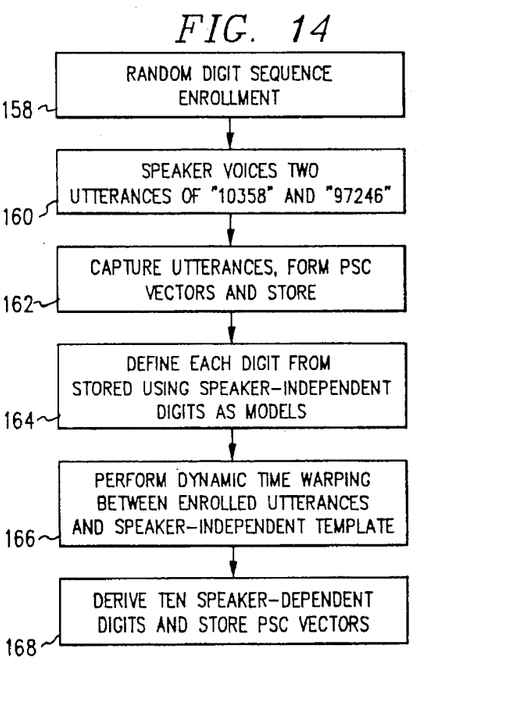
FIG. 14 is a flow diagram of the procedures for enrollment of a speaker in which the randomized digit sequence is employed.

Enrollment of desired speakers in connection with the secondary phrase of randomized digits is illustrated in FIG. 14. As noted in blocks 158 and 160, each speaker is enrolled in the verification system 14 by voicing the two utterances of digits "1,0,3,5,8" and "9,7,2,4, 6". The utterances are captured 162 by the system 14 and each digit is defined using the speaker-independent digits as models. In other words, the speaker-independent digits yield models of each digit, insofar as such digits are fairly well defined by the training population of the forty persons. Next, the PSC vectors of each frame of the captured utterance during enrollment is dynamic time warped 166 with each digit of the speaker-independent template. In other words, the PSC vectors of each frame of the enrolled utterance is dynamic time warped with the speaker-independent digit template corresponding to the digit "1". Next, the PSC vectors of the enrolled utterance are again dynamic time warped with the speaker-independent digit template of the digit "0". The same procedure is carried out through "3, 5, 8", as well as digits "9,7,2,4, 6".

Figure 15:
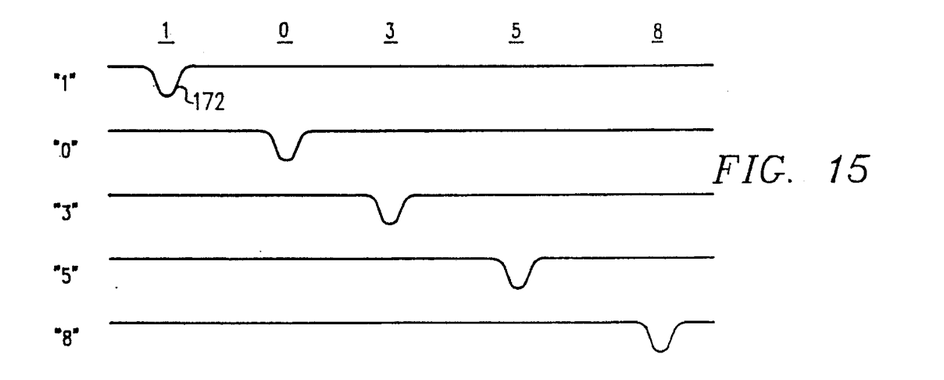
FIG. 15 graphically illustrates the scanning of a speaker independent frame with a speaker dependent frame of a digit sequence to form a reference template for use in the randomized digit option.

FIG. 15 illustrates an output of the dynamic time warping comparator with respect to the warping of the digits "1, 0, 3,5" and "8". The dip or valley 172 corresponding to the warping with the speaker-independent digit template of "1" arises when the Euclidean distance is minimum, as is the case when the "1" digit voiced during enrollment coincides with the speaker-independent digit template of the digit "1". The Euclidean distance minima is also shown in FIG. 15 with respect to digits "0,3,5,8". A similar output is formed on the Euclidean distance minima of the utterance "9,7,2,4,6". As a result, ten speaker-dependent digits are derived from the digit stream uttered during enrollment, which digits are based on an approximate model defined by the speaker-independent digit template. Principal spectral components and corresponding vectors are formed of each of the ten speaker dependent derived digits and stored 168 as a reference template for the speaker being enrolled. Once enrolled, the speaker-independent digit template is no longer used for comparison, but rather the speaker-dependent PSC vectors stored in accordance with program flow diagram block 168 are utilized.

Figure 16:
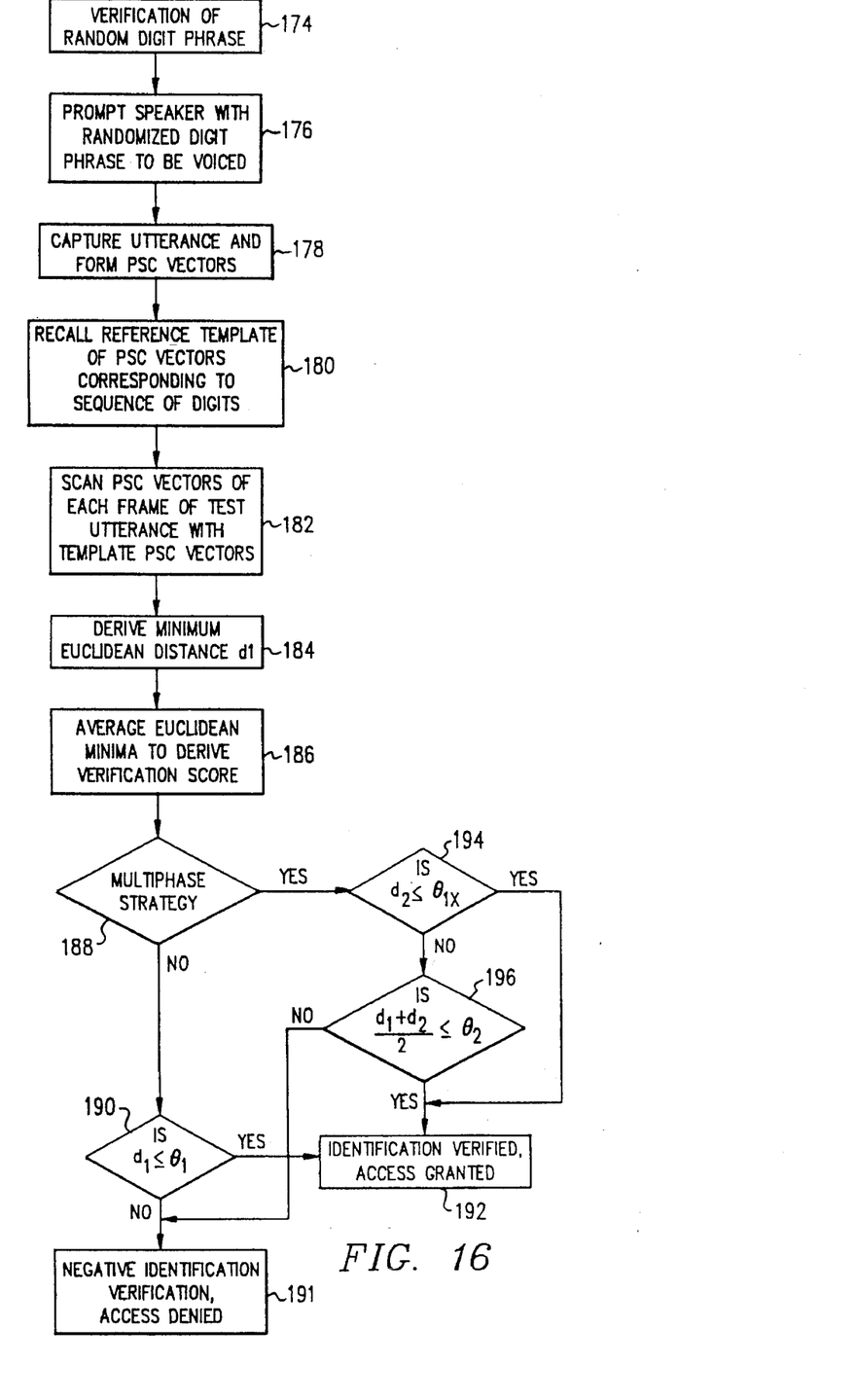
FIG. 16 illustrates a program flow diagram of the speaker verification system utilizing the optional randomized digit sequence.

The verification of a test utterance of the secondary randomized digit phrase with the PSC vectors derived during enrollment is shown in FIG. 16. In program flow diagram blocks 174 and 176, there are illustrated the identification system functions which couple an audio prompt to the speaker to input the randomized digit phrase to be voiced. Since the speaker verification system 14 has defined the digits, and the sequence to be voiced, the PSC vectors corresponding to such digits are recalled from the reference template, as noted by block 180. Then, all the frames of PSC vectors corresponding to the captured utterance are scanned with respect to each frame of PSC vectors of each reference template digit. This process is similar to that described in connection with FIG. 15, wherein the Euclidean minima are noted at the output of the dynamic time warping function. Block 184 illustrates the detection of the Euclidean distance minima for each of the five digits uttered. As depicted in program flow block 186, an average per frame is taken of all the Euclidean minima to derive a verification score. The verification score can also be used in conjunction with a multi-phrase strategy, wherein if the first utterance of the randomized phrase results in a system rejection, an additional attempt or attempts can be allowed.

In the event that a multi-phrase strategy is not utilized, program control will branch from block 188 of FIG. 16 to block 190. A simple numerical comparison is computed to determine if the verification score $d_1$ is less than a preset threshold $\theta_1$. If the comparison is in the affirmative, a positive identification is made 192, and access to the secure area is granted to the speaker. In the event that the equation in block 190 is not satisfied, a negative verification is made, wherein access to the speaker is denied.

Where a multi-phrase strategy is utilized, program control is branched from block 188 to block 194 to determine if a second attempt at a positive identification is successful. It is of course realized that the speaker will be prompted with a new and different digit sequence, which sequence will be voiced and processed by the speaker verification system 14 to derive a new verification score according to program block 186. If the new verification score $d_2$ is less than a different threshold $\theta_{1x}$, a positive identification is made 192 and access is granted to the speaker. On the other hand, if the results of the decision in block 194 is in the negative, program control is directed to block 196 to determine if the average of the verification scores $d_1$ and $d_2$ is less than yet another threshold number $\theta_2$. Again, if this constraint is not satisfied, program flow is directed to block 192 where access is granted to the speaker. If neither constraint 194 nor 196 are satisfied on the second attempt, a negative speaker identification is made and access is denied, as noted in block 191.

It should also be realized that the PSC vectors of the reference template used in conjunction with the randomized phrase can be updated in a manner similar to that described above. Also, digits other than, or in addition to those noted above, such as digits "16473" or "23581", etc., can be utilized in connection with the randomized phrase. Those skilled in the art will realize that the verification of the randomized digit phrase as illustrated in FIG. 16 can be used in conjunction with the verification of the fixed text statement shown in FIG. 2. Indeed, the program flow of the speaker identification system 14 can be transferred from that of FIG. 2 to the program flow of FIG. 16 if such optional technique is utilized. The program flow of FIG. 16 would not be encountered if a positive identification could not be made as a result of the fixed text statement alone.

In addition to preventing erroneous acceptance of the system by impostors using pre-recorded spoken words of true speakers, the randomized phrase also serves to further reject impostors, even if preliminary acceptance was granted with regard to the fixed text statement.

From the foregoing, an enhanced speaker verification system has been disclosed. Certain of the enhancements include reference template updating for improved definition of the speaker's voice signature, and a multi-phrase acceptance strategy for improving system acceptance of true speakers. Another enhancement includes speaker normalization for modifying the system function to accept inherently poor speakers, based upon previous performance.

While the preferred embodiment of the invention has been disclosed with reference to a specific speaker verification system and method, it is to be understood that many changes in detail may be made as a matter of engineering choices without departing from the spirit and scope of the invention, as defined by the appended claims.

What is claimed is:

1. A method for utilizing a speech utterance to verify an identity of a person, comprising the steps of:

collecting a representation of an identity asserted by the person;

collecting an uttered phrase from the person which has a predetermined sequence and converting the phrase into data characteristic of the person's voice;

comparing the characteristic data with other stored data characteristic of the phrase as spoken by the person to produce a match or a mismatch;

confirming the identity of the person on a match of said comparison;

denying the identity of the person on a mismatch of said comparison;

prompting said speaker a second time in response to a mismatch of said comparison to repeat said phrase;

comparing characteristic data of the repeated phrase with said other data to again determine a match or mismatch;

confirming or denying the identity of the person based upon said second comparison; and updating said other stored data on determining a match of said comparison by averaging said characteristic data with said other stored data and storing the result thereof for use in subsequent comparisons.

2. The method of claim 1 further including inputting said identity asserted by the person as non-spoken identity information.

3. The method of claim 1 further including inputting said phrase including information containing said non-spoken identity information.

4. The method of claim 3 further including inputting said phrase including information containing a fixed text statement.

5. The method of claim 4 further including inputting said fixed text statement including information containing a pair of two-syllable words.

6. The method of claim 5 further including inputting said fixed text statement including information containing a pair of words selected for constancy over a geographical area.

7. The method of claim 6 further including inputting information containing the first word of said pair of words which includes a place name, and said second word comprises a geographical feature.

8. The method of claim 1 further including prompting the person with a phrase having a number of randomly arranged digits.

9. The method of claim 8 further including rearranging said words on each attempt by the person to gain access.

10. The method of claim 1 wherein said collecting step comprising collecting an identity spoken by the person.

11. The method of claim 10 further including processing said spoken identity to determine the words characteristic of the identity.

12. The method of claim 11 further including processing said speaker identity a second time to determine the claimed identity of the person.

13. The method of claim 1 wherein said comparison is carried out by forming a numerical result thereof and determining whether said numerical result is greater or less than a threshold value to thereby produce said match or mismatch.

14. The method of claim 13 further including performing plural comparisons on repeated attempts of speaker verification, and forming a different threshold value for use in each said comparison.

15. The method of claim 14 further including utilizing a different threshold in connection with each said comparison, and determining whether said numerical result is greater than or less than said different threshold value.

16. The method of claim 13 further including setting said threshold by analyzing a histogram indicating the result of plural true speakers attempting said access and plural imposter speakers attempting said access.

17. The method of claim 13 further including maintaining a cumulative average of a number of said numerical results as computed over multiple attempts of the person to gain said access, and maintaining a global average of numerical results of plural different persons attempting to gain said access, and changing the magnitude of a current numerical result in a direction to cause a match when said cumulative average is greater than said global average.

18. A method of verifying the identity of individuals using voice as an identifying characteristic, comprising the steps of:

sampling speech signals and converting said signals into digital data;

converting said digital data by a linear predictive coding (LPC) technique to define an LPC vector;

converting said LPC vector into simulated amplitude vectors;

converting the amplitude vectors into respective uncorrelated features defining principal spectral components (PSC);

arranging the principal spectral components into a file having a number of frames;

time warping said file to match a stored reference file of principal spectral component data previously developed on enrollment of said individual;

processing the time warped principal spectral component data with the stored reference principal spectral component data to produce a numerical result;

comparing said numerical result with a threshold value; and confirm or deny identity of the person based upon the result of said comparison.

19. The method of claim 18 further including repeating the method an additional time on a second attempt if access is denied to the individual on a first attempt.

20. The method of claim 18 further including changing said threshold value on said second attempt.

21. The method of claim 18 further including prompting the individual with a fixed text statement which is repeated by the individual to form the speech signals.

22. The method of claim 21 further including prompting the individual with an identity code and with said fixed text statement.

23. The method of claim 22 further including prompting the individual with a fixed text statement comprising a pair of two-syllable words to enhance speaker consistency.

24. The method of claim 18 further including prompting said individual with a secondary phrase comprising a randomized sequence of words.

25. The method of claim 18 further including modifying said numerical result on an individual basis if a cumulative average numerical result of the individual is greater than a global average of numerical results of plural different individuals.

26. The method of claim 25 further including modifying said numerical result in a direction so as to grant access to the individual.

27. A method of providing access control utilizing speech utterances in a number of attempts defining a session, to verify an identity of a person, comprising the steps of:

forming a reference template of parameters characteristic of the speaker's speech;

converting signals of the speaker into similar parameters when said speaker seeks access;

processing said reference template with said similar parameters to derive a result $d_1$ indicative of the similarity between said parameters;

comparing said result $d_1$ with a threshold value $\theta_1$ in a first attempt;

granting or denying access to the person based upon the result of said first attempt comparison; and comparing a result $d_2$ with a threshold value $\theta_2$ on a second attempt if said first attempt results in a denial of said access.

28. The method of claim 27 wherein $\theta_1$ is less than $\theta_2$.

29. The method of claim 27 further including comparing the result $d_2$ with a threshold value $\theta_{2x}$ on said second attempt, where $d'_2$ is an average of $d_1$ and $d_2$.

30. The method of claim 29 further including comparing $d'_2$ with a threshold $\theta_{2x}$ which is different than or $\theta_1$ or $\theta_2$.

31. The method of claim 30 wherein said threshold value $\theta_{2x}$ is given by $\theta_1 < \theta_{2x}\theta_2$.

32. The method of claim 27 further including comparing a numerical result $d_3$ with a threshold value $\theta_{1x}$ on a third attempt, where $\theta_{1x}$ is less than $\theta_1$ or $\theta_2$.

33. The method of claim 32 further including comparing a result $d_3'$ defined by an average of $d_3$ and $d_2$ with a threshold $\theta_{2x}$.

34. The method of claim 33 further including defining $\theta_{2x}$ as being greater than $\theta_1$.

35. The method of claim 34 and further including defining $\theta_{2x}$ as being greater than $\theta_{1x}$.

36. The method of claim 32 further including comparing a result $d_3''$ defined by an average of $d_1$ and $d_3$, with a threshold $\theta_{2x}$.

37. The method of claim 32 further including comparing a result $d_3'''$ defined by an average of $d_1$, $d_2$ and $d_3$, with a threshold $\theta_3$.

38. The method of claim 37, further including defining $\theta_3$ as being greater than $\theta_1$ and $\theta_2$.

39. A method of providing access control utilizing a speech utterance to verify an identity of a person, comprising the steps of:

forming a reference template of parameters characteristic of the speaker's speech;

prompting the speaker to enter a fixed text statement;

prompting the person to enter a randomized text statement comprising a number of words which are randomly arranged, and which arrangement is generally unknown to the speaker;

converting the speech signals of said fixed text statement and the speech signals of said randomized text statement voiced by the person into test parameters;

processing said test parameters with said reference template parameters to derive a result indicative of a match or mismatch therebetween; and allowing access to the person if a match is found and denying access to the person if a mismatch is found.

40. The method of claim 39 wherein said randomized text statement is derived by selecting a digit sequence having minimal coarticulation effects between the words thereof.

41. The method of claim 40 further including forming a reference template associated with said randomized text statement using a first sequence of digits comprising "1,0,3,5,8" and a second sequence of digits comprising "9,7,2,4,6".

42. The method of claim 39 further including forming a randomized text reference template using a specific sequence of words, and randomly arranging said words for prompting the person, and comparing parameters of the randomly arranged words spoken by the person with said randomized text reference template.

43. The method of claim 42 further including forming a randomized text reference template for each word of the sequence.

44. The method of claim 43 further including forming said randomized text reference template using said specific sequence of digits voiced by a population of persons, and deriving speaker-independent digit templates for each said word.

45. The method of claim 44 further including forming said randomized text reference template by capturing an utterance of the specified words by a person to be enrolled, transforming the utterance into digital signal values and processing said digital signal values with the randomized text reference template to find a minimum Euclidean distance therebetween, and forming a new template for each word of the randomized text phrase using said minimum distance.

46. The method of claim 45 further including forming said new template by scanning each digit field of the person to be enrolled by the speaker-independent template to form a speaker dependent template.

47. Apparatus for utilizing a speech utterance to verify an identity of a person, comprising:

a prompter responsive to an identity asserted by the person for prompting the person to utter a phrase having a predetermined sequence of words;

a converter for collecting a representation of an uttered phrase of a predetermined sequence of words, and converting the representation into data characteristic of the person's voice;

a comparator for comparing the characteristic data with other stored data characteristic of the phrase as spoken by the person to produce a match or a mismatch;

a decision circuit for confirming the identity of the person on a match of said comparison and denying the identity of the person on a mismatch of said comparison;

a comparator for comparing characteristic data of a repeated phrase on a second attempt by the person with said other data to again determine a match or mismatch;

a decision circuit for confirming or denying the identity of the person based upon said second comparison; and means for updating said other stored data on determining said acceptance by averaging said characteristic data with said other stored data and means for storing the result thereof for use in subsequent comparisons.

48. The access control apparatus of claim 47 further including means for inputting said phrase including information containing said non-spoken identity information.

49. The access control apparatus of claim 48 further including means for inputting said phrase including information containing a fixed text statement.

50. The access control apparatus of claim 49 further including means for inputting said fixed text statement including information containing a pair of two-syllable words.

51. The access control apparatus of claim 50 further including means for inputting said fixed text statement including information containing a pair of words selected for constancy over a geographical area.

52. The access control apparatus of claim 51 further including means for inputting information containing the first word of said pair of words which includes a place name, and said second word which comprises a geographical feature.

53. The access control apparatus of claim 47 further including means for prompting the person with a phrase having a number of randomly arranged words.

54. The access control apparatus of claim 53 further including means for rearranging said words on each attempt by the person to gain access.

55. The access control apparatus of claim 47 wherein said collecting step comprises means for collecting an identity spoken by the person.

56. The access control apparatus of claim 55 further including means for processing said spoken identity to determine the words characteristic of the identity.

57. The access control apparatus of claim 56 further including means for processing said speaker identity a second time to determine the claimed identity of the person.

58. The access control apparatus of claim 47 wherein said comparison is carried out utilizing means for forming a numerical result thereof and means for determining whether said numerical result is greater or less than a threshold value to thereby produce said match or mismatch.

59. The access control apparatus of claim 58 further including means for performing plural comparisons on repeated attempts of speaker verification, and means for forming a different threshold value for use in each said comparison.

60. The access control apparatus of claim 59 further including means for utilizing a different threshold in connection with each said comparison, and means for determining whether said numerical result is greater than or less than said different threshold value.

61. The access control apparatus of claim 59 further including means for setting said threshold by analyzing a histogram indicating the result of plural true speakers attempting said access and plural imposter speakers attempting said access.

62. The access control apparatus of claim 58 further including means for maintaining a cumulative average of a number of said numerical results as computed over multiple attempts of the person to gain said access, and means for maintaining a global average of numerical results of plural different persons attempting to gain said access, and means for changing the magnitude of a current numerical result in a direction to cause a match when said cumulative average is greater than said global average.

63. The access control apparatus of claim 62 further including means for modifying said numerical result only when said current numerical result is less than said global average.

64. Apparatus for providing personnel access control utilizing speech utterances in a number of attempts defining a session, to verify an identity of a person, comprising:

a processor for forming a reference template of parameters characteristic of the speaker's speech;

a converter for converting signals of the speaker into similar parameters when said speaker seeks access;

a processor for processing said reference template with said similar parameters to derive a result $d_1$ indicative of the similarity between said parameters;

a comparator for comparing said result $d_1$ with a threshold value $\theta_1$ in a first attempt for granting or denying access to the person based upon the result of said first attempt comparison; and a comparator for comparing a result $d_2$ with a threshold value $\theta_2$ on a second attempt if said first attempt results in a denial of said access.

65. The apparatus of claim 64 wherein $\theta_1$ is less than $\theta_2$.

66. The apparatus of claim 64 further including means for comparing the result $d_2$ with a threshold value $\theta_{2x}$ on said second attempt, where $d'_2$ is an average of $d_1$ and $d_2$.

67. The apparatus of claim 66 further including means for comparing $d'_2$ with a threshold $\theta_{2x}$ which is different than $\theta_1$ or $\theta_2$.

68. The apparatus of claim 67 wherein said threshold value $\theta_{2x}$ is given by $\theta_1 < \theta_{2x} < \theta_2$.

69. The apparatus of claim 64 further including means for comparing a numerical result $d_3$ with a threshold value $\theta_{1x}$ on a third attempt, where $\theta_{1x}$ is less than $\theta_1$ or $\theta_2$.

70. The apparatus of claim 69 further including means for comparing a result $d_3'$ defined by an average of $d_3$ and $d_2$ nwith a threshold $\theta_{2x}$.

71. The apparatus of claim 69 further including means for comparing a result $d_3''$ defined by an average of $d_1$ and $d_3$, with a threshold $\theta_{2x}$.

72. The apparatus of claim 69 further including means for comparing a result $d_3'''$ defined by an average of $d_1$, $d_2$ and $d_3$, with a threshold $\theta_3$.

73. The apparatus of claim 72 further including means for defining $\theta_{2x}$ as being greater than $\theta_1$.

74. The apparatus of claim 73 and further including means for defining $\theta_{2x}$ as being greater than $\theta_{1x}$.

75. The apparatus of claim 72 further including means for defining $\theta_3$ as being greater than $\theta_1$ and $\theta_2$.

76. Apparatus for providing personnel access control utilizing a speech utterance to verify an identity of a person, comprising:

a processor for forming a reference template of parameters characteristic of the speaker's speech;

a prompter for prompting the speaker to enter a fixed text statement;

a prompter for prompting the person to enter a variable text statement comprising a number of words which are randomly arranged, and which arrangement is generally unknown to the speaker;

a converter for converting the speech signals of said fixed text statement and the speech signals of said variable text statement voiced by the person into test parameters; and a processor for processing said test parameters with said reference template parameters to derive a result indicative of a match or mismatch therebetween and for allowing access to the person if a match is found and for denying access to the person if a mismatch is found.

77. The apparatus of claim 76 wherein said variable text statement is derived by a selector means for selecting a digit sequence having minimal coarticulation effects between the words thereof.

78. The apparatus of claim 77 further including means for forming a reference template associated with said variable text statement using a first sequence of digits comprising "1,0,3,5,8" and a second sequence of digits comprising "9,7,2,4,6".

79. The apparatus of claim 76 further including means for forming a variable text reference template using a specific sequence of words, and means for ramdomly arranging said words for prompting the person, and means for comparing parameters of the randomly arranged words spoken by the person with said variable text reference template.

80. The apparatus of claim 79 further including means for forming a variable text reference template for each word of the sequence.

81. The apparatus of claim 80 further including means for forming said variable text reference statement using said specific sequence of digits voiced by a population of persons, and means for deriving speaker-independent digit templates for each said word.

82. The apparatus of claim 81 further including means for forming said variable text reference template by capturing an utterance of the specified words by a person to be enrolled, means for transforming the utterance into a digital field, and means for processing said digital field with the variable text reference template to find a minimum Euclidean distance therebetween, and means for forming a new template for each word of the variable text phrase using said minimum distance.

83. The apparatus of claim 82 further including means for forming said new template by scanning each digit field of the person to be enrolled by the speaker-independent template to form a speaker dependent template.

* * * * *